United States Patent

Harris

(10) Patent No.: US 10,874,931 B2
(45) Date of Patent: Dec. 29, 2020

(54) PROXIMITY SENSING DEVICES AND METHODS

(71) Applicant: KEEP THE SPACE, Morgan Hill, CA (US)

(72) Inventor: Timothy Paul Harris, Gilroy, CA (US)

(*) Notice: Subject to any disclaimer, the term of this patent is extended or adjusted under 35 U.S.C. 154(b) by 0 days.

(21) Appl. No.: 15/976,988

(22) Filed: May 11, 2018

(65) Prior Publication Data

US 2019/0060736 A1 Feb. 28, 2019

Related U.S. Application Data

(63) Continuation of application No. PCT/US2016/063931, filed on Nov. 29, 2016.
(Continued)

(51) Int. Cl.
*A63B 71/06* (2006.01)
*G06F 1/16* (2006.01)
(Continued)

(52) U.S. Cl.
CPC .......... *A63B 71/0619* (2013.01); *A63B 69/00* (2013.01); *G06F 1/163* (2013.01); *G06F 1/1698* (2013.01); *G06F 3/016* (2013.01); *G08B 7/06* (2013.01); *G08B 21/182* (2013.01); *G08B 21/22* (2013.01); *H04W 4/80* (2018.02);
(Continued)

(58) Field of Classification Search
CPC . A63B 71/0619; A63B 69/00; A63B 2102/14; A63B 2102/22; A63B 2102/24; A63B 69/002; A63B 69/0024; A63B 69/0026; A63B 2071/0625; A63B 2071/0655; A63B 2071/0663; A63B 2071/0666; A63B 2220/20; A63B 2225/50; A63B 2243/0025; A63B 2243/0066; G06F 3/016; G06F 1/163; G06F 1/1698; G08B 21/22; G08B 7/06; G08B 21/182; H04W 4/80; H04W 8/005
See application file for complete search history.

(56) References Cited

U.S. PATENT DOCUMENTS 5,144,294 A 9/1992 Alonzi et al.
5,557,259 A 9/1996 Musa
(Continued)

FOREIGN PATENT DOCUMENTS

WO 2005020518 A1 3/2005
WO 2017095781 A1 6/2017

*Primary Examiner* — Jeffrey S Vanderveen
(74) *Attorney, Agent, or Firm* — Buchalter, PC; Cecily Anne O'Regan (57) ABSTRACT

Devices are disclosed which are configurable to be worn by each of the players or persons on one or more teams playing a team sport or during activities requiring distance monitoring and notification of a breach in proximity. The devices are configurable to operate in a network environment to detect a device signal from one or more similarly configured devices worn by other players. The devices administer a proximity signal or alert to the users wearing the devices. The signal or alert can be audible, haptic, or both. The nature or quality of the proximity signal may change to reflect a distance to one or more other users. The devices can use RF or Bluetooth to measure the existence of a received signal, received signal strength of a like configured device. Devices can use an isotropic or omnidirectional antenna.

17 Claims, 5 Drawing Sheets

Related U.S. Application Data (60) Provisional application No. 62/260,775, filed on Nov. 30, 2015.

(51) Int. Cl.
    *G06F 3/01*     (2006.01)
    *H04W 4/80*     (2018.01)
    *A63B 69/00*     (2006.01)
    *G08B 7/06*     (2006.01)
    *G08B 21/18*     (2006.01)
    *G08B 21/22*     (2006.01)
    *H04W 8/00*     (2009.01)
    *A63B 102/14*     (2015.01)
    *A63B 102/22*     (2015.01)
    *A63B 102/24*     (2015.01)

(52) U.S. Cl.
    CPC ........... *H04W 8/005* (2013.01); *A63B 69/002* (2013.01); *A63B 69/0024* (2013.01); *A63B 69/0026* (2013.01); *A63B 2071/0625* (2013.01); *A63B 2071/0655* (2013.01); *A63B 2071/0663* (2013.01); *A63B 2071/0666* (2013.01); *A63B 2102/14* (2015.10); *A63B 2102/22* (2015.10); *A63B 2102/24* (2015.10); *A63B 2220/20* (2013.01); *A63B 2225/50* (2013.01); *A63B 2243/0025* (2013.01); *A63B 2243/0066* (2013.01)

(56) References Cited

U.S. PATENT DOCUMENTS

| | | | |
|---|---|---|---|
| 5,714,932 | A | 2/1998 | Castellon et al. |
| 7,106,191 | B1 | 9/2006 | Liberati |
| 7,737,850 | B2 | 6/2010 | Malik |
| 7,843,327 | B1 | 11/2010 | DiMartino et al. |
| 8,169,328 | B2 | 5/2012 | Duvall et al. |
| 8,909,190 | B2 | 12/2014 | Carson |
| 8,929,820 | B2 | 1/2015 | Elsom-cook et al. |
| 2002/0132211 | A1 | 9/2002 | August et al. |
| 2003/0071733 | A1* | 4/2003 | Hall ................ G01S 13/876 340/573.1 |
| 2004/0178906 | A1 | 9/2004 | Vaughan et al. |
| 2006/0250255 | A1 | 11/2006 | Flanagan |
| 2009/0322513 | A1 | 12/2009 | Hwang et al. |
| 2010/0009810 | A1 | 1/2010 | Trzecieski |
| 2011/0038114 | A1* | 2/2011 | Pance ................ G06F 1/1684 361/679.4 |
| 2013/0144411 | A1 | 6/2013 | Savarese et al. |
| 2014/0106735 | A1 | 4/2014 | Jackson et al. |
| 2014/0108084 | A1 | 4/2014 | Bargetzi et al. |
| 2014/0278229 | A1* | 9/2014 | Hong ................ A61B 5/486 702/160 |
| 2014/0361909 | A1* | 12/2014 | Stelfox ............ G06K 7/10297 340/870.07 |

\* cited by examiner

PROXIMITY SENSING DEVICES AND METHODS

CROSS-REFERENCE

This application is a continuation application of application Serial No. PCT/US2016/063931, filed Nov. 29, 2016, entitled Proximity Sensing Devices and Methods, which claims the benefit of application Ser. No. 62/260,775 filed Nov. 30, 2015, which applications are incorporated herein by reference in their entirety.

BACKGROUND

Soccer is a sport played between two teams of eleven players each. It is estimated that soccer (referred to as football internationally) is played by over 250 million players in over 150 countries, making it one of the world's most popular sports. In the United States, youth soccer has gained popularity and currently has over 3.5 million registered players. Children start playing soccer at the age of 4 and often continuing playing through high school and college.

One challenge of coaching young players in soccer, or other field sports, is getting the players to keep an adequate amount of distance or space between players during play. Often, the players end up bunched into a small geographic area around the ball on the field, which means that the space on the field or pitch is not used effectively by the players. This often results in parents and coaches yelling at the players, which distracts the players without actually providing any benefit to the kids or the game. Yelling does not significantly impact the play regardless of the fact that the players are bunched into a group. What is needed is a device which provides a person, such as a team sport player, notification and real-time feedback when bunching on the playing field is occurring. Additionally, what is needed is a way to communication with a medium that will aide in keeping the proper distance or space and the proper proximity of other players. Additionally, what is needed is a device that is an aide to players with partial vision loss or peripheral vision loss. These players cannot always sense that they might be crowding with other players. Lastly, what is needed is a system which compiles information for a coach to use with the players during a post-game review of play.

SUMMARY

Disclosed are devices which are configurable to be worn by each of the players on one or more teams playing a team sport. The devices are configurable to operate in a network environment to detect a device signal from one or more like configured devices worn by other players and to administer a proximity signal (audible or haptic) to the user(s) wearing the devices. The nature or quality of the proximity signal may change to reflect a distance to one or more other users. The devices can use RF or Bluetooth to measure the existence of a received signal, received signal strength of a like configured device. Devices can use an isotropic or omnidirectional antenna.

An aspect of the disclosure is directed to distance monitoring devices for alerting a user when a person (e.g., a player on a team) is within a selected distance of a selected number of other persons (e.g., players from the team). Suitable distance monitoring devices comprise: a housing containing, a channel selector; a transceiver configurable to transmit a signal at a selected frequency and detect one or more signals from one or more devices transmitting at the same selected frequency; an antenna; an alerting component configurable to generate at least one of an audible and haptic output when a target number of signals is received from one or more devices transmitting at the same frequency; and a power supply. The transceiver can be a single component or separate transmitter and receiver. One or more of a microprocessor, a memory, a display, an external antenna, and a communication port can also be included in the distance monitoring device. One or more of each of LEDs, and user interface buttons can also be included. A Bluetooth modem can also be provided. In at least some configurations, the channel selector is a dual channel selector. The transceiver can be configurable to send data to a second device. Where separate transmitter and receiver are provided, the transmitter can send to a second device while the receiver can receive from a second device.

Another aspect of the disclosure is directed to a distance monitoring device for alerting a user when a person (e.g., a player on a team) is within a selected distance of a selected number of other persons person (e.g., a players from the team) comprising: a housing containing a channel selector means; a transceiver means configurable to transmit a signal at a selected frequency and detect one or more signals from one or more devices transmitting at the same selected frequency; an antenna means; an alerting component means configurable to generate at least one of an audible and haptic output when a target number of signals is received from one or more devices transmitting at the same frequency; and a power supply means. Additionally one or more of a microprocessor means, a memory means, a display means, an external antenna means, and a communication port means can be provided. One or more of each of LEDs and user interface button means can be provided. A Bluetooth modem means can also be provided. The channel selector means can be a dual channel selector means. Additionally, the transceiver means is configurable to send data to a second device.

Still another aspect of the disclosure is directed to a system for alerting a user when a person (e.g., a player on a team) is within a selected distance of a selected number of other persons (e.g., players from the team). Suitable systems comprise: a first distance monitoring device having a housing containing a channel selector; a transceiver configurable to transmit a signal at a selected frequency and detect one or more signals from one or more devices transmitting at the same selected frequency; an antenna; an alerting component configurable to generate at least one of an audible and haptic output when a target number of signals is received from one or more devices transmitting at the same frequency; and a power supply; and a second device in communication with the first device. The first distance monitoring device can further comprise one or more of a microprocessor, a memory, a display, an external antenna, and a communication port. Additionally, the first distance monitoring device further comprises one or more of each of LEDs and user interface buttons. In some configurations, a Bluetooth modem is provided. The channel selector of the first distance monitoring device can be a dual channel selector. The transceiver of the first distance monitoring device is configurable to send data to a second device. In some configurations, the second device is a mobile phone. The first distance monitoring device can also be in communication with one or more secondary distance monitoring devices.

Yet another aspect of the disclosure is directed to a method of actively coaching or teaching one or more persons (e.g., players). Methods can comprise: engaging a first distance monitoring device having a first distance monitoring device housing containing a first distance monitoring device channel selector, a first distance monitoring device transceiver configurable to transmit a signal at a selected frequency and detect one or more signals from one or more devices transmitting at the same selected frequency, a first distance monitoring device antenna, a first distance monitoring device alerting component configurable to generate at least one of an audible and haptic output when a target number of signals is received from the one or more devices transmitting at the same frequency, and a first distance monitoring device power supply to a first user; and powering the first distance monitoring device; selecting a channel. Additionally, the method can include engaging a second distance monitoring device having a second distance monitoring device housing containing a second distance monitoring device channel selector, a second distance monitoring device transceiver configurable to transmit a signal at a selected frequency and detect one or more signals from one or more devices transmitting at the same selected frequency, a second distance monitoring device antenna, a second distance monitoring device alerting component configurable to generate at least one of an audible and haptic output when a target number of signals is received from the one or more devices transmitting at the same frequency, and a second distance monitoring device power supply to a second user; transmitting a first distance monitoring device signal; transmitting a second distance monitoring device signal; receiving the second distance monitoring device signal by the first distance monitoring device if the first distance monitoring device channel is set to the same frequency as the second distance monitoring device channel. Additionally, the method can include receiving a plurality of signals from a plurality of distance monitoring devices; determining if the plurality of signals exceeds an established training threshold; if the plurality of signals received exceeds the established training threshold issue an alert to the user.

INCORPORATION BY REFERENCE

All publications, patents, and patent applications mentioned in this specification are herein incorporated by reference to the same extent as if each individual publication, patent, or patent application was specifically and individually indicated to be incorporated by reference. See, for example, U.S. Pat. No. 5,557,259 A issued Sep. 17, 1996 to Musa for Proximity Alert and Direction Indicator;

U.S. Pat. No. 5,714,932 A issued Feb. 3, 1998 to Castellon et al. for Radio Frequency Security System with Direction and Distance Locator;

U.S. Pat. No. 7,106,191 B1 issued Sep. 12, 2006, to Liberati for Child Distance Monitoring and Alerting System;

U.S. Pat. No. 7,737,850 B2 issued Jun. 15, 2010, to Malik for Methods and Apparatus for Locating Emergency Personnel;

U.S. Pat. No. 7,843,327 B1 issued Nov. 10, 2010, to DiMartino, et al., for Proximity Detection and Alerting;

U.S. Pat. No. 8,169,328 B2 issued May 1, 2012, to Duvall, et al., for Proximity Monitoring and Locating System;

U.S. Pat. No. 8,909,190 B2 issued Dec. 9, 2014, to Carson for Portable Wireless Compatability Detection, Location and Communication Device;

U.S. Pat. No. 8,929,820 B2 issued Jan. 6, 2015, to Elsom-Cook, et al. for Short Range RF Monitoring System;

U.S. Pat. No. 5,144,294 A issued Sep. 1, 1992, to Alonzi et al. for Radio Frequency Message Apparatus for Aiding Ambulatory Travel of Visually Impaired Persons;

US 2006/0250255 A1 published Nov. 9, 2006, to Flanagan for Paired Child to Parent Separation Distance Monitoring and alarm System and Method of Same;

US 2009/0322513 A1 published Dec. 31, 2009, to Hwang et al. for Medical Emergency Alert System and Method;

US 2010/0009810 A1 published Jan. 14, 2010, to Trzecieski for Method and Apparatus for Interfacing Between a Wearable Electronic Device and a Serve and An Article of Fitness Equipment;

US 2013/0144411 A1 published Jun. 6, 2013, to Savarese et al., for Golf Club Apparatuses and Methods;

US 2014/0106735 A1 published Apr. 17, 2014, to Jackson et al. for User Identification and Location Determination in Control Applications; and US 2014/0108084 A1 published Apr. 17, 2014, to Bargetzi et al. for Initiating Schedule Management Via Radio Frequency Beacons.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1:
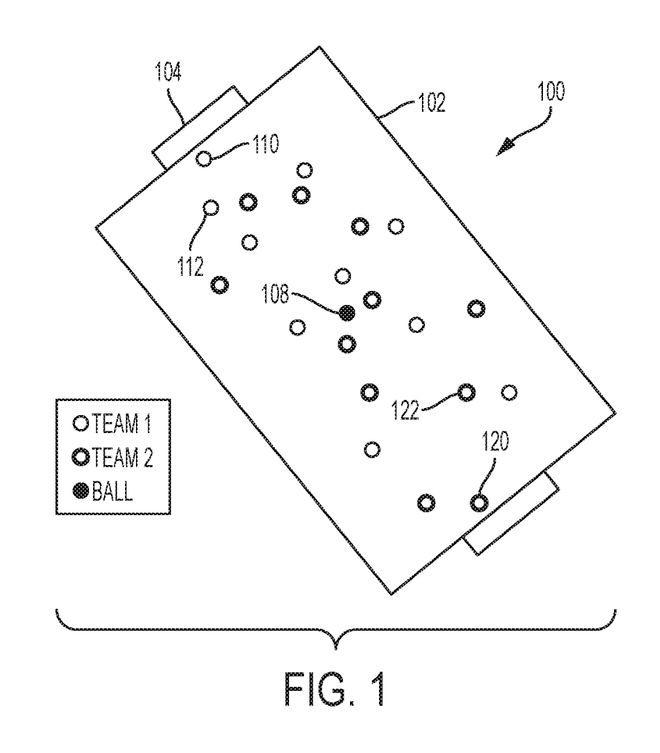
FIG. 1 illustrates a field, such as a soccer field, with a plurality of players and a ball.

FIG. 1 illustrates a playing environment 100 with a field 102 and a goal 104 at either end of the field. A typical playing environment is 100-110 m in length by 64-73 m wide. Exemplar fields include, but are not limited to: a soccer field, a field hockey field, a rugby field, lacrosse field, and a hockey rink. A plurality of players are shown from a first team having a first goalie 110, with a plurality of players 112. A second team having a second goalie 120 and a plurality of players 122 is also shown. The ball 108 is illustrated about mid-field. As will be appreciated by those skilled in the art, the nature of the game will determine the types of players present for each team and the type of playing environment (e.g., field or rink), the type of game piece used (e.g., ball or puck). While the disclosure uses soccer as an example, the devices can be used for training in other sports without departing from the scope of the disclosure.

Figure 2:
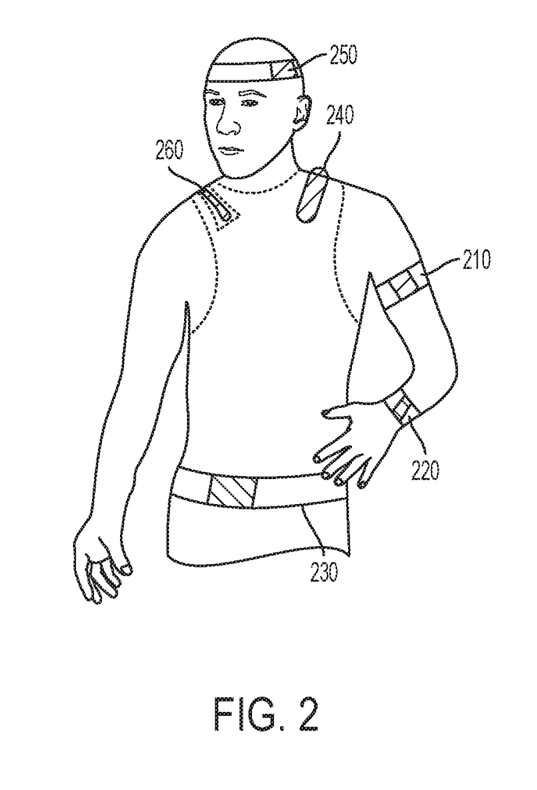
FIG. 2 illustrates a device according to the disclosure at a variety of placement locations on a player.

FIG. 2 illustrates exemplar devices 210, 220, 230, 240, 250, 260 according to the disclosure at a variety of placement locations on a player. Placement locations include, device 230 located at a waist of a player, device 220 located at a wrist of a player, device 210 located at an arm of a player, device 240 and device 260 located at a shoulder of a player, or device 250 located at a head of a player. Placement can be achieved by clipping the device onto apparel worn by the player (e.g., device 240), securing the device via a band (e.g., elastic or Velcro®) around a player (device 230 secured around the waist, device 220 secured around the wrist, device 210 secured around a bicep, device 250 secured around a head), by positioning the device within a sleeve or pocket on the apparel (e.g., device 260 positioned within a sleeve of a jersey near the shoulder), or any other suitable mechanism for adherence.

Figure 3:
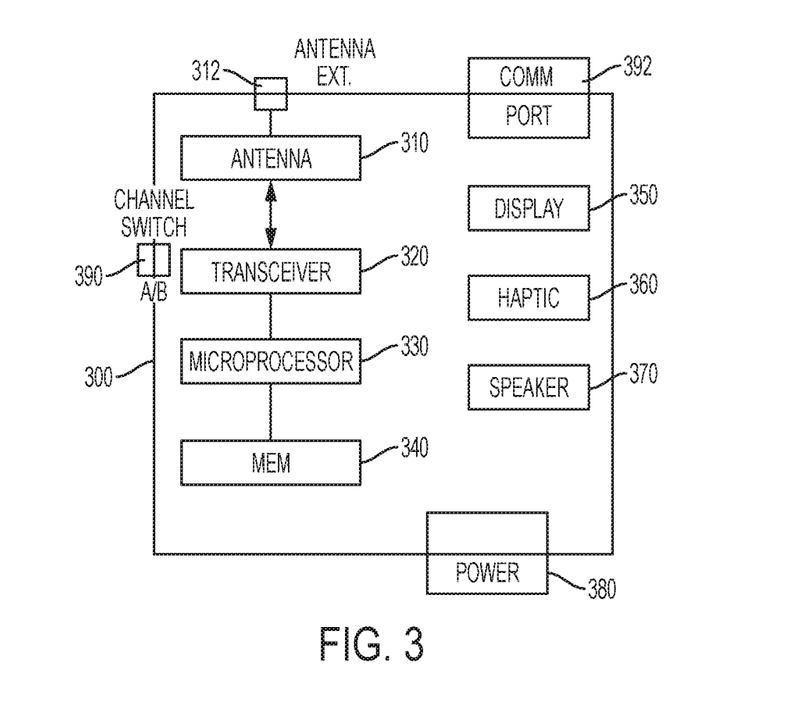
FIG. 3 is a block diagram of device components.

FIG. 3 is a block diagram 300 of device components. Components can include one or more of an antenna 310, a transceiver 320 (which can be separate transmitter and receiver components), microprocessor 330, memory 340, display 350, haptic device 360, speaker 370, power source 380 and channel switch 390. The power source 380 can be any suitable power source including a rechargeable or replaceable battery. Suitable batteries include Lithium 3.7V, 260 mAh lithium polymer rechargeable batteries having a length of 35 mm, a width of 12 mm, and a thickness of 6 mm. The devices and systems are configurable so that the frequency generated by the device varies depending on selected settings which can be achieved at a channel switch 390. For example, choosing one to many teams, can provide a unique frequency to isolate players for one team on a similar frequency. Additionally, a communication port 392 can be provided which provides a physical port or a virtual port (e.g. created by Bluetooth or USB-to-serial adapter) and provides access to the microprocessor 330. In at least some configurations the channel switch 390 is provided which allows the user to choose between channels, where a channel is assigned to a player or a team. In a two sport environment, like soccer, a first team would be assigned a first channel, such as channel A; a second team would be assigned a second channel, such as channel B.

Figure 4:
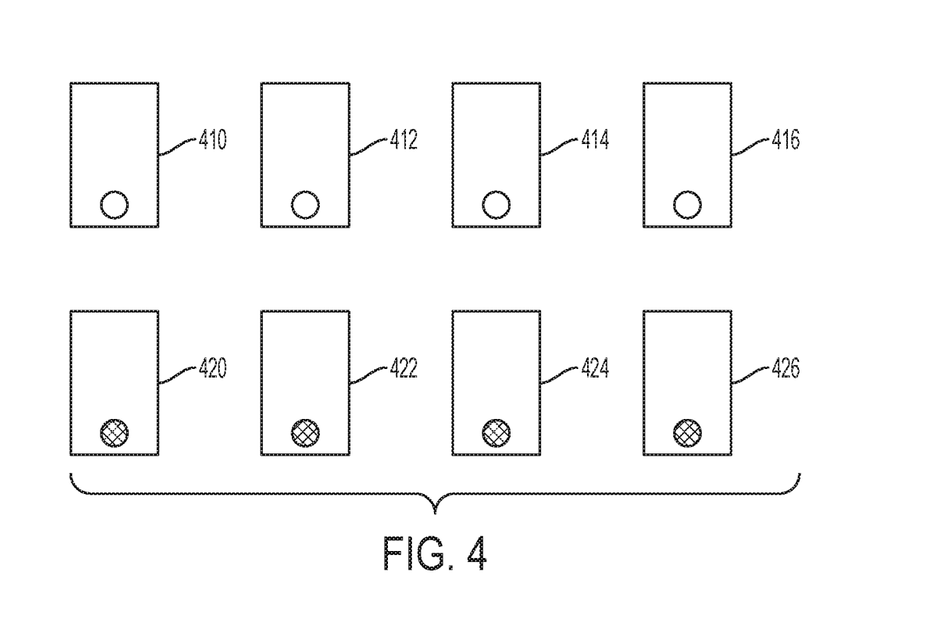
FIG. 4 illustrates a plurality of devices in communication with each other.

FIG. 4 illustrates a plurality of training devices 410, 412, 414, 416, 420, 422, 424, 426 which are configured to be in communication in a set. The training devices for a first team 410, 412, 414, 416 operate on a first channel (e.g., channel A) which is on a separate wavelength from the training devices of the second team 420, 422, 424, 426 which is operating on a second channel (e.g., channel B). The training devices for a particular team can additionally be in communication with a computing or mobile device in the possession of the coach for the team. In operation each player secures a training device to a desired part of the body (as shown in FIG. 2) and activates the training device by turning it on. The training device is capable of transmitting and receiving a signal within a geographic area of a field of play and periphery (e.g., about 120 m by 90 m). The training device may also be pairable with a base device, mobile device and/or computing device. The training device is configurable to engage a system where the system associates a first set of training devices with a first team engaged in play and a second set of training devices with a second team engaged in the same game. Each device can have a unique identifier, or each team can have a unique identifier which receives multiple identifiers of the same frequency for evaluation to determine the players and relative proximity of each player to another player on the same team. In some configurations, players receive alerts based on relative geographic location of other players on the same team and not players on the opposing team. As a player moves about the field, the player's device is configurable to detect the number and proximity of other players within a target range and to generate an audible and/or haptic signal to the user when the number and/or proximity of team players exceeds a specified or target value. Additionally, the player's device may be configurable to determine whether the received signal is associated with a player from their team or the opposing team.

Figure 5:
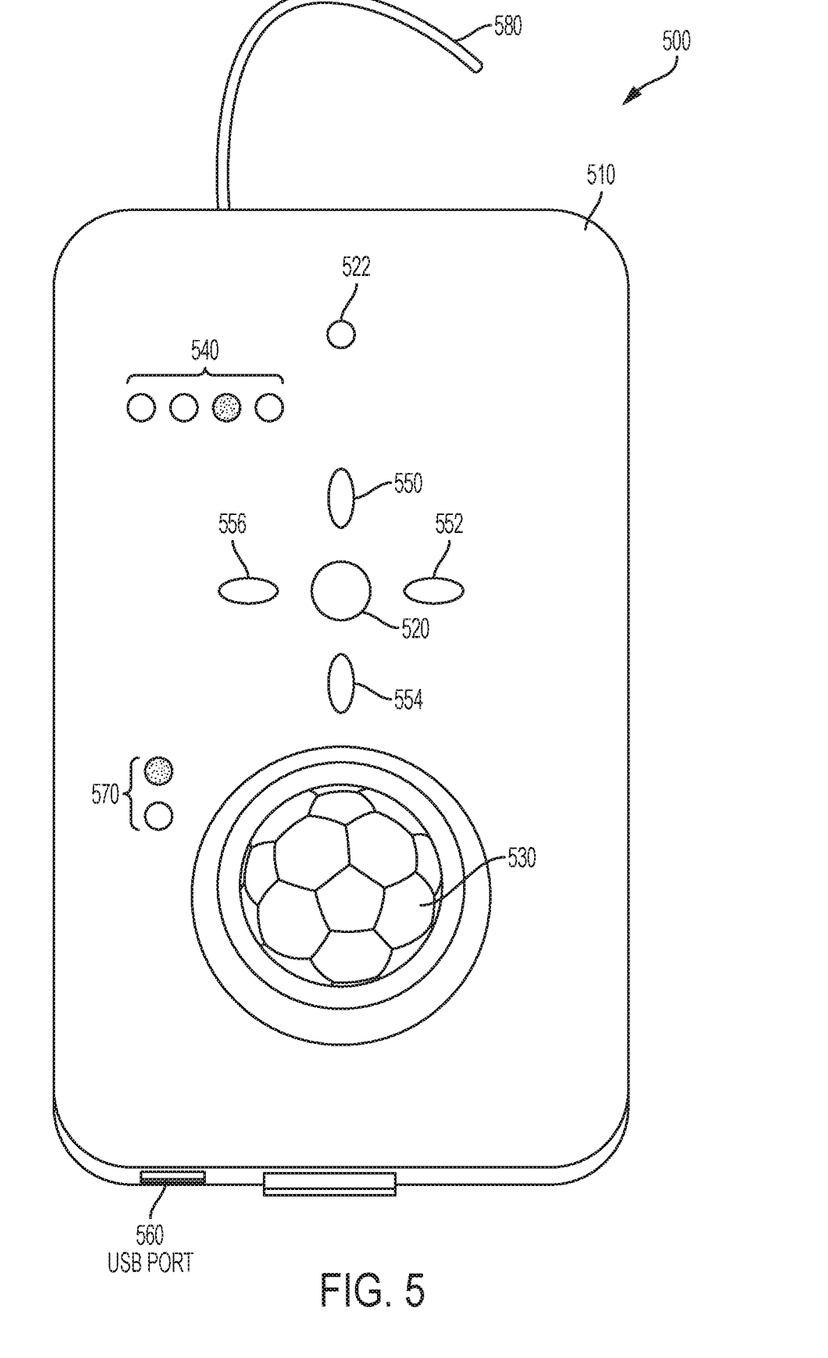
FIG. 5 illustrates an exemplar housing for a device.

FIG. 5 illustrates an exemplar housing for the device 500. The device 500 has a housing 510 which encases electronics. An on/off button 520 can be provided. A light 522 can also be provided which indicates whether the device 500 is on or off. An additional series of distance lights 540 can be provided which indicate a distance setting in feet. For example, 1 foot, 5 feet, 10 feet, 15 feet. The distance lights 540 can be color coded based on the distance setting. Operational buttons 550, 552, 554, 556 can be provided which can be used for selecting a distance (550), selecting a team (556), selecting a volume (554), and for connecting with a mobile app (552) for a coach to provide one-way direction to the player. The team select button can be further configured to change colors of a set of teach selection indicators 570 depending on the team selected. A buzzer 530 can be provided. In at least some configurations, a mini-USB battery charging port 560 is provided. An antenna extension 580 can be provided which is external to the housing 510.

Figure 6A:
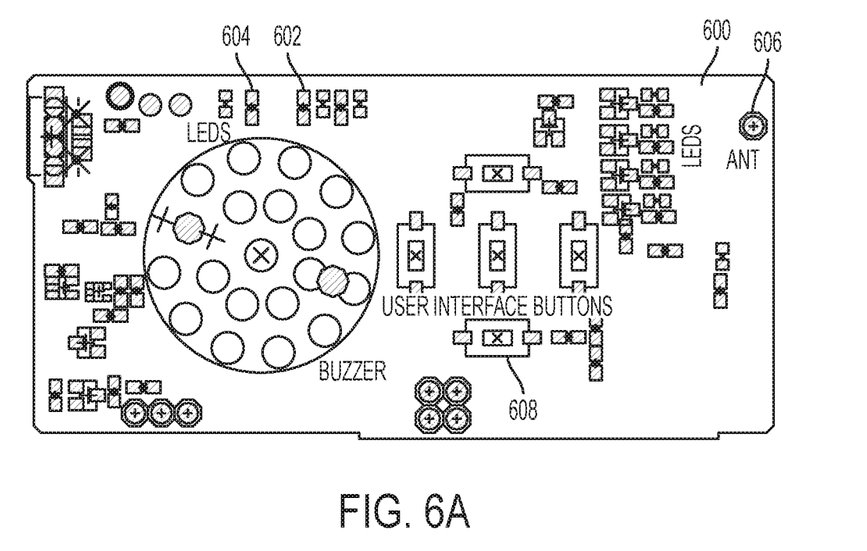
FIGS. 6A-B illustrate a top side of a board with component placement and a bottom side of the board.
Figure 6B:
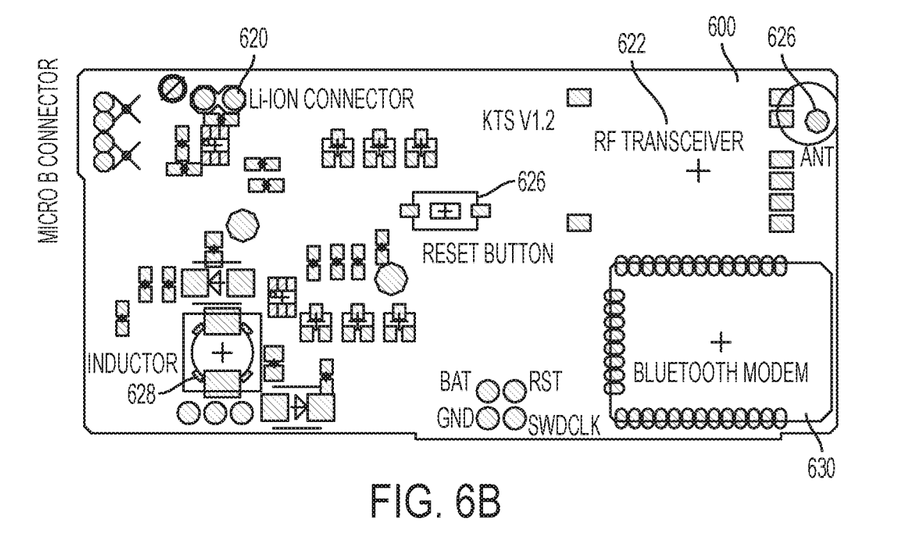

FIG. 6A-B illustrates the top surface (FIG. 6A) and bottom surface (FIG. 6B) of a board 600. The board 600 can have a dimension of, for example, 72.88 mm×35.51 mm. The upper surface of the board 600 has LEDs 602, 604, an antenna 606, a plurality of user interface buttons 608, and a buzzer 610. The opposing surface of the board 600 includes a Lithium ion connector 620, an RF transceiver 622, an antenna 624, a reset button 626, an inductor 628, and a Bluetooth modem 630. The transceiver can be a single unit or separate transmitter and receiver units without departing from the scope of the disclosure.

Figure 7:
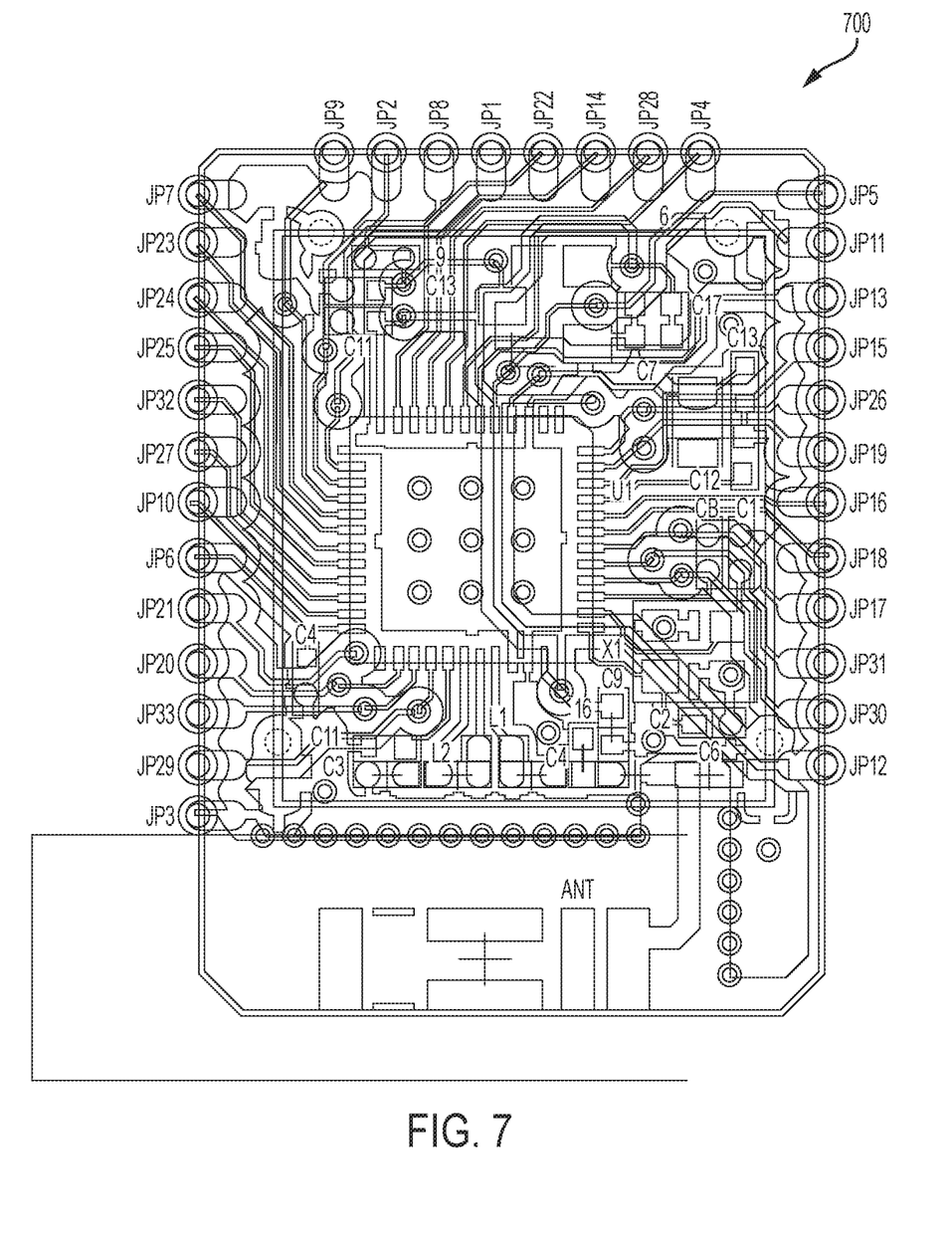
FIG. 7 illustrates a low power Bluetooth module.

FIG. 7 illustrates a low power Bluetooth module (BLE) 700 which is configured for use in a short distance wireless communication field. The low power Bluetooth module can have flexible power management with: a supply voltage range of 1.8V to 3.6V, 2.5 mu s wake-up using 16 MHz RCOSC; 0.4 mu A at 3 V off mode; 0.5 mu A at 3V in off mode plus 1 region RAM retention; and a 2.3 mu A at 3 V on mode, with all blocks idle. The working frequency band can be sent at ~2400 to 2483.5 MHz. The max launch power can be +5 dBm (with normal 0 dBm output). A 2.4 GHz transceiver can be provided with: −93 dBm sensitivity in Bluetooth low energy mode; 250 kbps, 1 Mbps, 2 Mbps supported data rates; Tx power −20 to +4 dBm in 4 dB steps; Tx power −30 dBm whisper mode; 13 mA peak Rx, 10.5 mA peak tx (0 dBm); and RSSI (1 dB resolution). The module is illustrated with 33 Pins which provide I/O, ground, and power. The size of the of the module 700 is from about 10-16 mm in width, 15-25 mm in length and 0.3-0.5 mm in thickness, more preferably 14.4 mm in width, 19.7 mm in length and 0.4 mm in thickness.

The training device can loop search for a signal and transmission from one or more other units and then process and measure signal strength within each unit. The searching is timed searching performed at intervals. Intervals can be from 5 seconds to 60 seconds, for example. If the signal strength is above a specified or target threshold, the player is notified audibly, haptically, or both, which encourages movement in some way of the player away from a collection of other players. As the player moves away, the signal strength decreases and the notification stops or changes quality. The system is configurable to detect multiple discreet signals from one or more devices that are part of the same network.

Additionally, the system is configurable to change the specified or target range and number of players. For example, when players are ages 4-7, a target space might be 4 feet and a player or number of players might be 5, while a player of 8-13 might receive an alert when 4 players are within 6 feet.

In addition to providing real-time feedback to the players and coaches, the system can collect data for use after the game is completed. For example, the coach could receive a summary as follows:

TABLE 1

Summary of Game Performance
Team: Bluebells
Age: 4-7
Target space: 4 feet

| Player | Amount of Play Time | Percentage of time within 4 feet of other team members | Number of times within 4 feet of team members | Average number of players in group |
|---|---|---|---|---|
| Annie | 90 | 25 | 5 | 6 |
| Barbara | 90 | 10 | 3 | 2 |
| Betty | 90 | 15 | 4 | 2 |
| Caroline | 90 | 17 | 4 | 3 |
| Cathy | 90 | 12 | 3 | 2 |
| Cindy (G) | 90 | 10 | 2 | 3 |
| Debbie | 90 | 23 | 4 | 5 |
| Fiona | 90 | 20 | 4 | 4 |
| Maddy | 90 | 15 | 3 | 6 |
| Sylvia | 90 | 18 | 5 | 4 |
| Trish | 90 | 12 | 2 | 6 |

Table 1 illustrates an exemplar summary of game performance which is aggregated by the system for the coach and transmitted to a mobile device. The summary can be generated real-time or near real-time during the game. Additionally, the coach can scroll through a heat map that captures a representation of location of players at points in time during the game. The heat map can be used to identify the locations of players during the game at distinct moments of time.

The systems and methods according to aspects of the disclosed subject matter may utilize a variety of mobile, computer and computing systems, communications devices, networks and/or digital/logic devices for operation. Each may, in turn, be configurable to utilize a suitable computing device which can be manufactured with, loaded and/or fetch from some storage device, and then execute, instructions that cause the computing device to perform a method according to aspects of the disclosed subject matter.

A computing device can include without limitation a mobile user device such as a mobile phone, a smart phone and a cellular phone, a personal digital assistant ("PDA"), such as an Android® device, iPhone®, a tablet, a laptop and the like. In at least some configurations, a user can execute a browser application over a network, such as the Internet, to view and interact with digital content, such as screen displays. A display includes, for example, an interface that allows a visual presentation of data from a computing device. Access could be over or partially over other forms of computing and/or communications networks. A user may access a web-browser, e.g., to provide access to applications and data and other content located on a web-site or a web-page of a web-site.

A suitable computing device may include a processor to perform logic and other computing operations, e.g., a stand-alone computer processing unit ("CPU"), or hard wired logic as in a microcontroller, or a combination of both, and may execute instructions according to its operating system and the instructions to perform the steps of the method, or elements of the process. The user's computing device may be part of a network of computing devices and the methods of the disclosed subject matter may be performed by different computing devices associated with the network, perhaps in different physical locations, cooperating or otherwise interacting to perform a disclosed method. For example, a user's portable computing device may run an app alone or in conjunction with a remote computing device, such as a server on the Internet. For purposes of the present application, the term "computing device" includes any and all of the above discussed logic circuitry, communications devices and digital processing capabilities or combinations of these.

Certain embodiments of the disclosed subject matter may be described for illustrative purposes as steps of a method which may be executed on a computing device executing software, and illustrated, by way of example only, as a block diagram of a process flow. Such may also be considered as a software flow chart. Such block diagrams and like operational illustrations of a method performed or the operation of a computing device and any combination of blocks in a block diagram, can illustrate, as examples, software program code/instructions that can be provided to the computing device or at least abbreviated statements of the functionalities and operations performed by the computing device in executing the instructions. Some possible alternate implementation may involve the function, functionalities and operations noted in the blocks of a block diagram occurring out of the order noted in the block diagram, including occurring simultaneously or nearly so, or in another order or not occurring at all. Aspects of the disclosed subject matter may be implemented in parallel or seriatim in hardware, firmware, software or any combination(s) of these, co-located or remotely located, at least in part, from each other, e.g., in arrays or networks of computing devices, over interconnected networks, including the Internet, and the like.

The instructions may be stored on a suitable "machine readable medium" within a computing device or in communication with or otherwise accessible to the computing device. As used in the present application a machine readable medium is a tangible storage device and the instructions are stored in a non-transitory way. At the same time, during operation, the instructions may at sometimes be transitory, e.g., in transit from a remote storage device to a computing device over a communication link. However, when the machine readable medium is tangible and non-transitory, the instructions will be stored, for at least some period of time, in a memory storage device, such as a random access memory (RAM), read only memory (ROM), a magnetic or optical disc storage device, or the like, arrays and/or combinations of which may form a local cache memory, e.g., residing on a processor integrated circuit, a local main memory, e.g., housed within an enclosure for a processor of a computing device, a local electronic or disc hard drive, a remote storage location connected to a local server or a remote server access over a network, or the like. When so stored, the software will constitute a "machine readable medium," that is both tangible and stores the instructions in a non-transitory form. At a minimum, therefore, the machine readable medium storing instructions for execution on an associated computing device will be "tangible" and "non-transitory" at the time of execution of instructions by a processor of a computing device and when the instructions are being stored for subsequent access by a computing device.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A distance monitoring device for alerting a user playing a team sport when the user is within a selected distance of a selected number of other persons playing the team sport comprising:
   a housing containing,
   a channel switch having a first channel position corresponding to a first signal frequency and a second channel position corresponding to a second signal frequency, different from the first signal frequency;
   a transceiver configured to transmit a signal at a frequency selected from the first signal frequency and the second signal frequency and to directly detect a signal strength of one or more signals received from one or more secondary distance monitoring devices transmitting at the same signal frequency of the transceiver wherein the received signal strength from the one or more secondary distance monitoring devices transmitting at the frequency of the transceiver reflects a distance of the distance monitoring device to the one or more secondary distance monitoring devices;
   a microprocessor configured to determine a relative geographic location of one or more distance monitoring devices transmitting at the same signal frequency of the transceiver, and generate an alert instruction when a number or proximity of devices transmitting at the same signal frequency exceeds a specified value and further wherein the specified value is selected based on an age range of the players of the team sport and an optimal distance between the players of the team sport for the selected age range;
   an antenna;
   an alerting component configured to generate at least one of an audible and haptic output in response to the alert instruction from the microprocessor; and
   a power supply.

2. The distance monitoring device of claim 1 further comprising one or more of a memory, a display, a light, an external antenna, a charging port, and a communication port.

3. The distance monitoring device of claim 1 further comprising one or more LEDs.

4. The distance monitoring device of claim 1 further comprising one or more user interface buttons.

5. The distance monitoring device of claim 1 further comprising a Bluetooth transmitter.

6. The distance monitoring device of claim 1 wherein the transceiver is configured to send data from the distance monitoring device to a second device configured to receive data from a plurality of distance monitoring devices.

7. A system for alerting a user when the user is within a selected distance of a selected number of other persons comprising:
   a first distance monitoring device having a housing containing a channel switch having a first channel position corresponding to a first signal frequency and a second channel position corresponding to a second signal frequency, different from the first signal frequency, a transceiver configured to transmit a signal at a frequency selected from the first signal frequency and the second signal frequency and to directly detect a signal strength of one or more signals received from one or more secondary distance monitoring devices transmitting at the frequency of the transceiver wherein the received signal strength from the one or more secondary distance monitoring devices transmitting at the frequency of the transceiver reflects a distance of the distance monitoring device to the one or more secondary distance monitoring devices, a microprocessor configured to determine a relative geographic location of one or more distance monitoring devices transmitting at the same signal frequency of the transceiver, and generate an alert instruction when a number or proximity of devices transmitting at the same signal frequency exceeds a specified value and further wherein the specified value is selected based on an age range of the players of the team sport and an optimal distance between the players of the team sport for the selected age range, an antenna, an alerting component configured to generate at leak one of an audible and haptic output in response to the alert instruction from the microprocessor, and a power supply; and
   a second device configured to receive data from a plurality of distance monitoring devices in communication with the first distance monitoring device.

8. The system of claim 7 wherein the first distance monitoring device further comprises one or more of a memory, a display, an external antenna, and a communication port.

9. The system of claim 8 wherein the first distance monitoring device further comprises one or more LEDs.

10. The system of claim 9 wherein the second device is a mobile phone.

11. The system of claim 9 wherein the first distance monitoring device is communication with one or more secondary distance monitoring devices.

12. The system of claim 8 wherein the first distance monitoring device further comprises one or more user interface buttons.

13. The system of claim 8 wherein the first distance monitoring device further comprises a Bluetooth transmitter.

14. The system of claim 8 wherein the transceiver of the first distance monitoring device is configured to send data to the second device.

15. A method of actively teaching one or more players of a team sport comprising:
   engaging a first distance monitoring device having a first distance monitoring device housing containing a first distance monitoring device channel switch having a first channel position corresponding to a first signal frequency and a second channel position corresponding to a second signal frequency, different from the first signal frequency, a first distance monitoring device transceiver configured to transmit a signal at a frequency selected from the first signal frequency and the second signal frequency and to directly detect a signal strength of one or more signals from one or more secondary devices transmitting at the frequency of the transceiver of the first distance monitoring device wherein the received signal strength reflects a distance to the one or more secondary distance monitoring devices transmitting at the frequency of the transceiver of the first distance monitoring device, a first distance monitoring microprocessor configured to determine a relative geographic location of one or more distance monitoring devices transmitting at the same signal frequency of the first distance monitoring transceiver, and generate an alert instruction when a number or proximity of devices transmitting at the same signal frequency exceeds a specified value, a first distance monitoring device antenna, a first distance monitoring device alerting component configured to generate at least one of an audible and haptic output, and a first distance monitoring device power supply to a first player;

powering the first distance monitoring device;

selecting a first distance monitoring device channel from a first channel position and a second channel position;

selecting an age range for the players, a threshold number of players and a target distance between the players for the selected age range;

determining the relative geographic location of one or more distance monitoring devices transmitting at the same signal frequency of the transceiver; and generating an alert instruction when a number or proximity of devices transmitting at the same signal frequency exceeds a specified value wherein the specified value is based on an age range of the players of the team sport and an optimal distance between the players of the team sport for the age range.

16. The method of claim 15 comprising:

engaging a second distance monitoring device having a second distance monitoring device housing containing a second distance monitoring device channel switch having a first channel position corresponding to a first signal frequency and a second channel position corresponding to a second signal frequency, different from the first signal frequency, a second distance monitoring device transceiver configured to transmit a signal at a frequency of the first distance monitoring device and to detect a signal strength of one or more signals received from one or more distance monitoring devices transmitting at the selected frequency of the first distance monitoring device transceiver, a second distance monitoring device microprocessor configured to determine a relative geographic location of one or more distance monitoring devices transmitting at the same signal frequency of the transceiver, and generate an alert instruction when a number or proximity of devices transmitting at the same signal frequency exceeds a specified value, a second distance monitoring device antenna, a second distance monitoring device alerting component configured to generate at least one of a second monitoring device audible and second monitoring device haptic output to a second player;

transmitting a first distance monitoring device signal from the first distance monitoring device;

transmitting a second distance monitoring device signal from the second distance monitoring device; and receiving the second distance monitoring device signal by the first distance monitoring device when the first distance monitoring device channel is set to the selected frequency of the second distance monitoring device channel.

17. The method of claim 16 comprising:

receiving a plurality of signals from a plurality of distance monitoring devices wherein each distance monitoring device is set to the same channel;

determining if the plurality of signals received from the plurality of distance monitoring devices exceeds an established training threshold; and if the plurality of signals received from the plurality of distance monitoring devices exceeds the established training threshold, generating the at least one of the audible and haptic output to at least one of the first player and the second player.

* * * * *